March 1, 1949.　　　D. O. SPROULE　　　2,463,328
SYSTEM OF WAVE TRAINS
Filed July 6, 1945　　　　　　　　　　　2 Sheets-Sheet 1
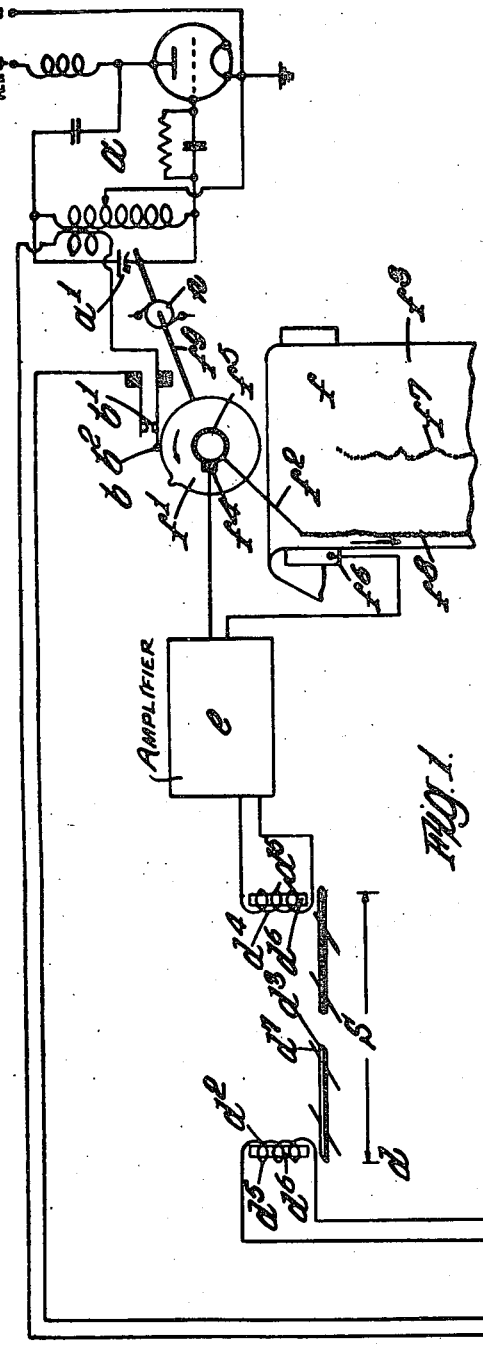
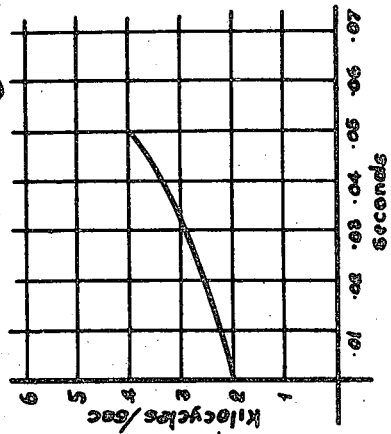
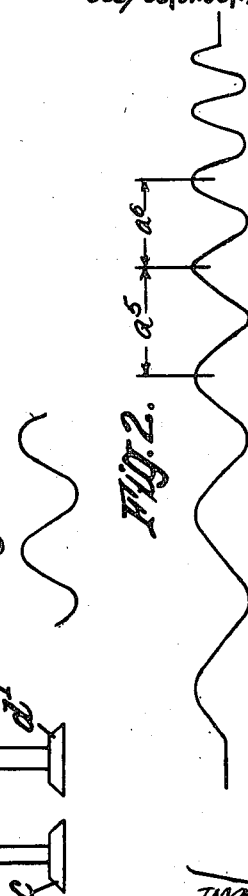
INVENTOR:
Donald Orr Sproule
BY
Hoguet, Neary & Campbell
ATTORNEYS

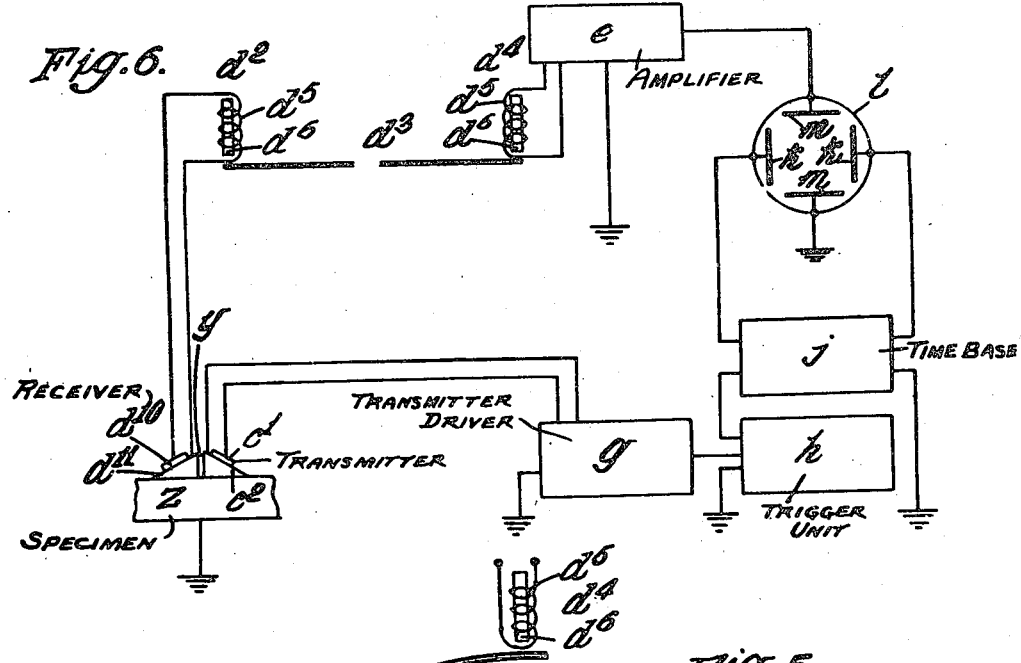

Patented Mar. 1, 1949

2,463,328

UNITED STATES PATENT OFFICE 2,463,328

SYSTEM OF WAVE TRAINS

Donald Orr Sproule, London, England, assignor to Henry Hughes & Son Limited, London, England, a British limited liability company Application July 6, 1945, Serial No. 603,441
In Great Britain June 9, 1944

8 Claims. (Cl. 177—386)

This invention relates to systems operating by means of wave trains and has for its object to enable improved effects to be obtained in a simple and reliable manner and with an economy of energy.

The invention is capable of application to wave trains of all kinds, may be employed in television, in radar, in echo sounding, in flaw detection and in a variety of other uses in which short trains of waves are used to form a signal or to mark a time interval and although in the following description specific reference generally is made to arrangements in which trains of waves are reflected, such as in marine echo sounders and flaw detectors, it is to be understood quite clearly that such specific reference is for the purpose of explanation and is given by wap of example only, the invention also being applicable to all the uses and for all the purposes in which short trains of mono-intensity waves or amplitude modulated continuous waves have been employed.

When echo sounding equipment is applied to the measurement of distance e. g. the depth of the sea, it is usual to so energise the electro-acoustic emitter that the acoustic signal comprises a heavily damped short train of waves and when the electro-acoustic receiver responds to the echo of this signal a heavily damped train of electrical waves is generated as a pulse which is fed to a thermionic rectifier and/or amplifier.

In such an equipment the receiver has to be designed to have a broad pass band capable of receiving the short train of waves but unfortunately the quantity of stray waves, produced by noise, random scattering, etc., received is proportional to the width of the pass band and general interference arises limiting the width.

Practice shows that this general interference due to noise is sufficiently serious to necessitate an increase in the echo to noise ratio and hitherto this has been effected in some cases by increasing the intensity of the transmission, a remedy that is subject to economical and technical limitations, and in other cases by increasing the selectivity of the receiver system, thus making use of longer trains of waves from the emitter; a remedy that tends to increase the build-up time and reduce precision, particularly in flaw detection, owing to the intensity of the random scattering from small irregularities.

It is found frequently that the noise level and the intensity of the random scattering may both be of such magnitude as to face the designer with the conflicting requirements of increasing the length of the wave train constituting the signal pulse to off-set one defect and decreasing the length of the wave train constituting the signal pulse to off-set the other defect so that it frequently happens that the application of echo sounding equipment is considerably limited.

The invention contemplates echo sounding equipment in which the precision and selectivity is improved without increasing the intensity in the wave trains, without increasing the susceptibility to interference from noise and without increasing the effect of random scattering.

This invention involves an improved system operating by means of wave trains and comprises means for applying a slurred frequency wave train of finite duration (in which the velocity of the wave elements depends upon their frequency) to condensing means by which said slurred frequency wave train is converted into a mono-frequency wave train the duration of which is a fraction of the finite duration of the slurred frequency wave train. This novel result is effected by establishing the correct physical relations between the range of frequencies and the rate of change of frequency in the wave train transmitted and the thickness, length, configuration and/or constitution of the strip (with or without adjuncts comprising the condensing means). The term "slurred frequency wave train" as used herein is intended to mean a wave train, the frequency of which varies continuously from an initial value to a different terminal value, said terminal value being of higher frequency for the case of transverse waves in the strip.

In one form the improved system of wave trains comprises means for converting a slurred frequency electrical wave train of finite duration into a train of mass vibrations; means for condensing said train of mass vibrations and means for converting said condensed train of mass vibrations into a mono-frequency electrical wave train, the duration of which is a fraction of the finite duration of the slurred frequency wave train.

When applying the present invention to echo sounding equipment each generated electrical pulse is in the form of a train of waves, the duration of which is finite but generally considerably greater than is usual or than is necessary for the degree of precision in timing required and the frequency of the waves in such train is varied during transmission (slurred frequency) according to a law depending on the method of analysis used in the receiver system.

The receiver system has a band width sufficiently wide to respond to the whole train of waves constituting the echo without sensible relative attenuation of any frequency and includes means providing effects that vary the speed of transmission of succeeding elemental parts of said wave train therein so that after the passage of a predetermined period of time the succeeding elemental parts tend to coalesce or to become condensed into a fraction of the finite duration of the signal pulse, so far as is possible according to the laws of wave motion, said condensed pulse appearing as an output from the receiver system in the form of a voltage capable of being amplified and indicated or recorded in the usual way.

In order that the nature of this invention may be the better understood an example thereof will now be described in relation to the accompanying drawings reference being had to the figures thereof and letters thereon; like letters indicating like parts in the various figures in which:

Figure 1 is a schematic diagram showing the invention applied to a marine echo sounding recording equipment.

Figure 2 is a schematic diagram showing the form of wave train constituting a signal pulse;

Figure 3 is a schematic diagram showing the form of the condensed pulse forming the output from the receiver system;

Figure 4 is a frequency/time diagram showing a rate of change of frequency suited to a described embodiment of the invention;

Figure 5 is a detail view of a form of disperser alternative to that shown in Figure 1; and Figure 6 is a schematic diagram showing the invention applied to a flaw detecting equipment.

As shown in Figure 1 the marine echo sounding equipment comprises an oscillator $a$, contactor $b$, emitter $c$, receiver system $d$, thermionic rectifier and/or amplifier $e$ and recorder $f$.

The oscillator $a$ for the sake of simplicity is shown as a shunt fed Hartley circuit in which the rotor of the tuning condenser $a^1$ is rotated by the spindle $f^9$ of the recorder $f$ so that during transmission at regular intervals of time the frequency is varied continuously to give to each succeeding elemental part of the wave train a frequency that is higher than that of the preceding elemental part according to the requirements of the receiver system $d$, thus enabling electrical pulses each of which consist of a comparatively long train of waves with a frequency that varies continuously, somewhat as shown diagrammatically in Figure 2, to be produced each time the contacts $b^1$ are closed.

The contactor $b$ is of known construction in the art and consists of contacts $b^1$ that are closed by the cam $f^1$ of the recorder $f$ through the intermediation of the lower blade $b^2$ the timing in the present instance being adjusted so that the operational instant of time is slightly in advance of that instant when the rotating stylus $f^2$ of the recorder $f$ passes the zero station $f^8$ on the record strip $f^3$ to provide the necessary time period within which the wave condensation that forms the subject of the present invention can take place.

The emitter $c$ also is of known construction in the art and may consist of a pack of annular nickel laminations with a toroidal winding of insulated wire to form a magneto strictive device capable of emitting an acoustic signal (supersonic or not) when excited by the output from the oscillator $a$.

The receiver system $d$ comprises an electro-acoustic receiver $d^1$, an electro-acoustic transducer $d^2$, a long metal strip $d^3$ acting as a disperser and an electro-acoustic transducer $d^4$.

The electro-acoustic receiver $d^1$ may be a magneto strictive assembly somewhat similar to that used in the emitter $c$ capable of responding to acoustic signals over a broad pass band and arranged so that when it is acoustically excited by the echo of the signal from the emitter $c$ it generates an electrical pulse in the form of a wave train comparable with that shown diagrammatically in Figure 2 and increases with the output from the oscillator $a$.

The electro-acoustic transducer $d^2$, as shown in Figures 1, 5 and 6 consists of an electro-magnet having a winding $d^5$ and a core $d^6$ of hard steel or other known permanently magnetic material arranged to set up transverse vibrations in the long metal strip $d^3$.

The long metal strip $d^3$ is supported by a plurality of laterally disposed fibres $d^7$ of silk or other appropriate material arranged to allow the required transverse vibrations without material interference.

If the frequency variation in the output of the oscillator $a$ is adjusted so that each succeeding elemental part $a^6$ of the wave train has a frequency sufficiently higher than that of the preceding elemental part $a^5$ (see Figure 2) the elemental part $a^6$ will overtake the elemental part $a^5$ after travelling a distance S along the metal strip $d^3$ and this distance S will be very nearly the same for all the elemental parts of the wave train with the result that the comparatively long train of waves the frequency of which varies continuously and which has a duration of, say for example, one twentieth part of a second as shown diagrammatically in Figure 2, will be condensed into a relatively short train of waves having one and the same frequency and a duration of, say for example, one two-thousandth part of a second as shown in Figure 3.

The electro-acoustic transducer $d^4$, which may be of similar construction to that of the electro-acoustic transducer $d^2$, is applied to the strip $d^3$ at the distance S from the electro-acoustic transducer $d^2$ and operates to generate an electrical pulse of the form shown diagrammatically in Figure 3 when excited by the condensed mono-frequency wave train of short time duration.

The fluctuating electrical current constituting the electrical pulse is fed to thermionic unit $e$ to be amplified and if necessary rectified, the output from $e$ being applied to the recorder $f$.

The recorder $f$ shown in Figure 1 by way of example is of ordinary construction in the art and comprises a contactor cam $f^1$, continuously rotating stylus $f^2$ and constantly moving moistened chemical record strip $f^3$ all operated by a constant speed electromotor $n$ the output from $e$ being fed to the stylus $f^2$ through the brush $f^4$ and slip ring $f^5$ and returned through the platen $f^6$ after electrolytically decomposing the chemical in the strip $f^3$ to produce records such as $f^7$ and $f^8$.

In cases where the metal strip $d^3$ is of considerable length it can be coiled as shown in Figure 5 the length S being in all cases adduced from the well known equation:

$$U = K_1 \nu^{\frac{1}{2}}$$

where

U = the group velocity of a transverse vibration $$K_1 = \text{a constant} = 2(4\pi^2 K_3^2 Q/\rho)^{\frac{1}{2}} \qquad (2)$$

$\nu$ = the frequency $K_3$ = the radius of gyration of the section of the strip Q = Young's modulus and $\rho$ = the density of the material used.

The procedure for determining the critical length S is outlined briefly below. In this example, it will be assumed that the wave train has a duration of .05 sec., a maximum frequency of 4,000 cycles and a minimum frequency of 2,000 cycles, and that a strip of brass .1 cm. wide and .01 cm. thick is used as the strip $d^3$.

As a first step it is necessary to determine the group velocity U of a transverse vibration in the stiff strip $d^3$ as a function of frequency $\nu$, which velocity is given by Equation 1 above.

For the strip $d^3$ being considered, $$Q/\rho = (3.42 \times 10^5 \text{ cms./sec.})^2 \qquad (3)$$

and:

$$K_3 = \frac{.01}{\sqrt{12}} \qquad (4)$$

Substituting these values in Equation 2 it is found that:

$$K_1 =$$
$$2\sqrt[4]{4 \times 9.86 \times (.01/\sqrt{12})^2 \times (3.42 \times 10^5)^2} = 156 \text{ approx.} \qquad (5)$$

If the wave train starts from a frequency of $\nu_1$ cycles per second, in order to obtain the maximum condensation the frequency must vary according to the following law:

$$\nu^{\frac{1}{2}} = \frac{T_2 \nu_1^{\frac{1}{2}}}{T_2 - t} \qquad (6)$$

where $t$ = the instantaneous time measured from the beginning of the train of waves and $T_2$ = the time for super-position to occur, bearing in mind that Equation 6 holds for the case where $$\nu = \nu_2 \text{ and } t = T_1$$

Substituting the values $T_1 = .05$ sec.; $\nu_1 = 2,000$ cycles per second and $\nu_2 = 4,000$ cycles per second in Equation 6 and solving for $T_2$ it will be found that:

$$T_2 = \frac{\sqrt{4000} \times .05}{\sqrt{4000} - \sqrt{2000}} = .172 \text{ approx.} \qquad (7)$$

From this the distance travelled for super-position to occur can be determined because Equation 1 gives the velocity for the initial frequency $\nu_1$ which travels for a time $T_2$ that is .172 second and so travels a distance:

$$S = 2K_1 \nu_1^{\frac{1}{2}} T_2 \qquad (8)$$

from which:

$$S = 156 \times \sqrt{2000} \times .172 = 1200 \text{ cm. approx.} \qquad (9)$$

It is now possible to calculate the frequency of the wave train during transmission and for this purpose Equation 6 is used, substituting in turn values for $t = .01$ sec.; .02 sec. and so on and solving for $\nu$. These results can be tabulated thus:

| t | 0 | .01 second | .02 second | .03 second | .04 second | .05 second |
|---|---|---|---|---|---|---|
| $\nu$ | 2000 | 2250 | 2560 | 2930 | 3400 | 4000 cycles per second. | and depicted graphically as shown in Figure 4 of the drawings.

The constant $K_1$ is one well recognized in this technique and it is known that it is a function of the radius of gyration of the section of the strip $d^3$ so that although a rectangular cross section is used in the example given, the invention is not limited in any way to such cross section but stiff strips with other cross sections can be used.

By way of example, if the output from the oscillator $a$ is such that each time the contacts $b^1$ are closed there is produced a train of electrical waves having a duration of one-twentieth part of a second with a maximum frequency of four thousand cycles per second and a minimum frequency of two thousand cycles per second as shown diagrammatically in Figure 2 and the electrical pulse generated in the electro-acoustic receiver $d^1$ by the arrival of an echo is fed to an electro-acoustic transducer $d^2$ applied to one end of a strip $d^3$ of brass about twelve hundred centimeters long, one tenth of a centimeter wide and one-hundredth of a centimeter thick which may be coiled into a spiral of five regularly spaced turns the mean radius of which is about thirty-eight and one-tenth centimeters, then the output from the electro-acoustic transducer $d^4$ placed at the end remote from the electro-acoustic transducer $d^2$ will consist of a train of mono-frequency waves having a duration of only about one two-thousandth part of a second as shown in Figure 3.

As shown in Figure 6 the flaw detecting equipment comprises a transmitter driver $g$, a flaw detecting unit $y$, an amplifier $e$ and a cathode ray oscillograph $l$.

In manner known in the technique of flaw detecting, the flaw detecting unit $y$ comprises a piezo electric transmitter $c^1$ mounted on a wedge $c^2$ mechanically articulated to a wedge $d^{11}$ on which is disposed a piezo electric receiver $d^{10}$ so that the beam angularly emitted from the transmitter $c^1$ is reflected by the flaw, inclusion or the like in the specimen $z$ into the receiver $d^{10}$ disposed angularly for that purpose.

The trigger unit $h$ periodically initiates the time base $j$ causing the cathode ray beam on the cathode tube $l$ to begin its forward trace. The trigger unit $h$ also operates the transmitter driver $g$ which applies an energizing pulse to the transmitter $c^1$. Due to induction effects accompanying the transmission and picked up by the receiver system, the time base appearing on the cathode ray tube $l$ is deflected vertically at the time of transmission.

Wave energy reflected from a flaw in the specimen $z$ or from the bottom face thereof, for example, is picked up by the receiver $d^{10}$ and impressed upon the transducer $d^2$ which produces a corresponding wave in the strip $d^3$. The condensed wave train in the wave strip $d^3$ is picked up by the transducer $d^4$ which is connected to the input terminals of the amplifier $e$. The amplified signal is impressed on the deflected vertical plates of the cathode ray tube $l$ producing other vertical deflection or deflections of the time base corresponding to echoes from a flaw or the bottom face of the specimen $z$, or both.

Clearly, the strip $d^3$ may be made of a metal other than brass such, for example, as nickel or steel and may be arranged otherwise than in a flat spiral and devices of other kinds producing the same effect may be used.

With such transmitter and receiver systems, it is possible to improve the echo to reverberation ratio of the condensed wave train one hundred times on an energy basis as compared with a continuous wave train having a duration of one-twentieth part of a second.

It will be understood that the showings in Figures 2 and 3 have no relation whatever to the character or dimension of the wave trains actually used, being merely intended to indicate diagrammatically the frequency modulation from the oscillator $a$, the signal from the emitter $c$, the echo energizing the receiver $d^1$ or the electrical pulse fed to the transducer $d^2$ without distinction so far as Figure 2 is concerned and to indicate diagrammatically the condensed mono-frequency wave train produced so far as Figure 3 is concerned.

When the invention is applied to radar equipment the condensing effect is obtained by using wave guides of suitable cross-section and length to obtain the required result and when the length is greater than is convenient for use in straight form then the wave guides can be arranged as a spiral or helix.

What is claimed is:

1. A wave train system comprising means for providing an electrical wave train of finite duration, the frequency of which increases from an initial value to a terminal value of relatively higher frequency, means for converting said wave train into a train of mass vibrations and for condensing said train of mass vibrations to produce a train of mass vibrations of substantially constant frequency and of lesser duration than said electrical wave train, and means for converting said condensed train of mass vibrations into a substantially mono-frequency electrical wave train, the duration of which is a fraction of the finite duration of said electrical wave train.

2. A wave train system comprising means for providing an electrical wave train of finite duration, the frequency of which increases from an initial value to a terminal value of relatively higher frequency, an electro-acoustic transducer adapted to receive said electrical wave train, a metal strip having one end operatively associated with said transducer and adapted to be set in transverse vibration thereby, the dimensions of said strip being such that said transverse vibrations are substantially condensed to a wave train of substantially constant frequency and of lesser duration than said electrical wave train at a given location thereon, and a second electro-acoustic transducer adapted to be energized by said condensed transverse vibrations at said given location for converting them into a substantially mono-frequency wave train, the duration of which is a fraction of the finite duration of said electrical wave train.

3. A wave train system comprising means for providing an electrical wave train of finite duration, the frequency of which increases from an initial value to a terminal value of relatively higher frequency, an electro-acoustic transducer adapted to receive said electrical wave train, a spirally coiled metal strip having one end operatively associated with said transducer and adapted to be set in transverse vibration thereby, the dimensions of said strip being such that said transverse vibrations are substantially condensed to a wave train of substantially constant frequency and of lesser duration than said electrical wave train at a given location thereon, and a second electro-acoustic transducer adapted to be energized by said condensed transverse vibrations at said given location for converting them into a substantially mono-frequency wave train, the duration of which is a fraction of the finite duration of said electrical wave train.

4. A wave train system comprising means for emitting into a medium a wave train of finite duration, the frequency of which increases from an initial value to a terminal value of relatively higher frequency, means for receiving said wave train from said medium, means for converting said received wave train into a substantially mono-frequency wave train, the duration of which is a fraction of the duration of the said wave train of finite duration, and means for comparing the moment of emission of said wave train of finite duration with the moment of reception of said mono-frequency wave train, whereby time intervals between the emission of said wave train of finite duration and the reception of said mono-frequency wave train may be ascertained.

5. An echo sounding system comprising a source for providing an electrical wave train of comparatively long but finite duration, the frequency of which increases from an initial value to a terminal value of relatively higher frequency, an electro-acoustic transmitter energized by said source, an electro-acoustic receiver responsive to echoes of signals emitted by said electro-acoustic transmitter, an electro-acoustic transducer energized by the output of said electro-acoustic receiver, a metal strip having one end operatively associated with said transducer and adapted to be set in transverse vibration thereby, the dimensions of said strip being such that said transverse vibrations are substantially condensed to a wave train of substantially constant frequency and of lesser duration than said electrical wave train at a given location thereon, a second electro-acoustic transducer operatively associated with said metal strip at said other end thereof for converting said condensed transverse vibrations into a substantially mono-frequency electrical wave train, the duration of which is a fraction of the finite duration of said electrical wave train, means for amplifying and/or rectifying said mono-frequency wave train, and means for measuring the echo time between the emission of said electrical wave train and the reception of said mono-frequency wave train.

6. An echo sounding system comprising a source for providing an electrical wave train of comparatively long but finite duration, the frequency of which increases from an initial value to a terminal value of relatively higher frequency, an electro-acoustic transmitter energized by said source, an electro-acoustic receiver responsive to echoes of signals emitted by said electro-acoustic transmitter, an electro-acoustic transducer energized by the output of said electro-acoustic receiver, a spirally coiled metal strip having one end operatively associated with said transducer and adapted to be set in transverse vibration thereby, the dimensions of said strip being such that said transverse vibrations are substantially condensed to a wave train of substantially constant frequency and of lesser duration than said electrical wave train, at a given location thereon, a second electro-acoustic transducer operatively associated with said metal strip at said given location for converting said condensed transverse vibrations into a substantially mono-frequency electrical wave train, the duration of which is a fraction of the finite duration of said electrical wave train, means for amplifying and/or rectifying said mono-frequency wave train, and means for measuring the echo time between the emission of said electrical wave train and the reception of said mono-frequency wave train.

7. Flaw detecting apparatus comprising a source for providing an electrical wave train of comparatively long but finite duration, the frequency of which increases from an initial value to a terminal value of relatively higher frequency, a piezo-electric transmitter energized by said source for directing signals to a specimen under examination, a piezo-electric receiver responsive to signals from said specimen, an electro-acoustic transducer energized by the output of said electro-acoustic receiver, a spirally coiled metal strip having one end operatively associated with said transducer and adapted to be set in transverse vibration thereby, the dimensions of said strip being such that said transverse vibrations are substantially condensed to a wave train of substantially constant frequency and of lesser duration than said electrical wave train at a given location thereon, a second electro-acoustic transducer operatively associated with said metal strip at said given location for converting said condensed transverse vibrations into a substantially mono-frequency electrical wave train, the duration of which is a fraction of the finite duration of said electrical wave train, a cathode ray oscilloscope having one pair of deflector plates excited by said mono-frequency wave train and having a second pair of deflector plates, and means for exciting said second pair of deflector plates in timed relation with the emission of said electrical wave train.

8. In systems utilizing wave trains, the combination of means for producing a wave train of finite duration, the frequency of which varies continuously from an initial value to a different terminal value, and means forming a transmission path for said wave train, the dimensions of said path forming means being selected so that at a predetermined location thereon said wave train appears as a wave train of substantially constant frequency, the duration of which is less than the duration of said wave train of finite duration.

DONALD ORR SPROULE.

REFERENCES CITED

The following references are of record in the file of this patent:

UNITED STATES PATENTS

| Number | Name | Date |
| --- | --- | --- |
| 1,775,775 | Nyquist | Sept. 16, 1930 |
| 2,009,460 | Turner | July 30, 1935 |
| 2,011,392 | Bentley | Aug. 13, 1935 |
| 2,280,226 | Firestone | Apr. 21, 1942 |
| 2,371,988 | Granquist | Mar. 20, 1945 |